United States Patent
Schaller et al.

(10) Patent No.: US 12,510,428 B2
(45) Date of Patent: Dec. 30, 2025

(54) MEDIA-RESISTANT PRESSURE SENSOR FOR LARGE PRESSURE RANGES

(71) Applicant: Infineon Technologies AG, Neubiberg (DE)

(72) Inventors: Rainer Markus Schaller, Saal a.d. Donau (DE); Thomas Mueller, Lappersdorf (DE); Bernhard Winkler, Lappersdorf (DE)

(73) Assignee: Infineon Technologies AG, Neubiberg (DE)

( * ) Notice: Subject to any disclaimer, the term of this patent is extended or adjusted under 35 U.S.C. 154(b) by 416 days.

(21) Appl. No.: 17/647,548

(22) Filed: Jan. 10, 2022

(65) Prior Publication Data

US 2022/0244122 A1  Aug. 4, 2022

(30) Foreign Application Priority Data

Jan. 29, 2021  (DE) .......................... 102021102046.8

(51) Int. Cl.
   *G01L 7/08*   (2006.01)
   *G01L 19/00*  (2006.01)

(52) U.S. Cl.
   CPC .......... *G01L 7/082* (2013.01); *G01L 19/0038* (2013.01); *G01L 19/0061* (2013.01)

(58) Field of Classification Search
   None
   See application file for complete search history.

(56) References Cited

U.S. PATENT DOCUMENTS

| | | | |
|---|---|---|---|
| 6,076,409 A | 6/2000 | Bang | |
| 7,276,090 B2* | 10/2007 | Shahinpoor | G01N 27/4073 29/25.03 |
| 7,311,007 B2* | 12/2007 | Vogler | G01L 19/0645 73/756 |
| 8,671,766 B2 | 3/2014 | Sterling et al. | |
| 9,316,552 B2 | 4/2016 | Wagner et al. | |
| 9,446,944 B2* | 9/2016 | Ernst | B81B 7/007 |
| 9,625,336 B2 | 4/2017 | Thiele et al. | |
| 2014/0107796 A1* | 4/2014 | Stein | A61F 2/389 600/587 |
| 2015/0210535 A1* | 7/2015 | Roth | G01L 9/0072 257/419 |
| 2017/0089784 A1* | 3/2017 | Yamagishi | G01L 19/0038 |
| 2017/0113917 A1* | 4/2017 | Yoshikawa | G01L 9/0048 |
| 2017/0343441 A1 | 11/2017 | Chen et al. | |

(Continued)

FOREIGN PATENT DOCUMENTS

| | | |
|---|---|---|
| CN | 1284163 A | 2/2001 |
| CN | 1983582 A | 6/2007 |

(Continued)

*Primary Examiner* — John E Breene
*Assistant Examiner* — Nigel H Plumb
(74) *Attorney, Agent, or Firm* — Harrity & Harrity, LLP

(57) ABSTRACT

In some embodiments, a pressure sensor may comprise a housing, a flexible membrane which, together with the housing, forms a hermetically closed cavity, a sensor element arranged in the hermetically closed cavity, and a gaseous medium in the hermetically closed cavity. The sensor may detect a change in a physical property, of the flexible membrane, associated with an external pressure pressing inward into the flexible membrane of the hermetically closed cavity.

20 Claims, 6 Drawing Sheets

(56) References Cited

U.S. PATENT DOCUMENTS

| | | | | |
|---|---|---|---|---|
| 2018/0160922 A1* | 6/2018 | Arnold | ................... | G01L 19/14 |
| 2019/0086283 A1* | 3/2019 | Wagner | ................ | G01L 9/0055 |
| 2020/0326252 A1* | 10/2020 | Kusanale | ............ | G01L 19/0084 |
| 2020/0333204 A1* | 10/2020 | Chen | ................... | B23K 11/093 |
| 2020/0386643 A1* | 12/2020 | Haeussermann | ..... | G01L 9/0042 |

FOREIGN PATENT DOCUMENTS

| | | |
|---|---|---|
| CN | 202442825 U | 9/2012 |
| CN | 102786025 A | 11/2012 |
| CN | 103562697 A | 2/2014 |
| CN | 106461481 A | 2/2017 |
| CN | 106644244 A | 5/2017 |
| CN | 111256886 A | 6/2020 |
| DE | 10340075 A1 | 3/2005 |
| DE | 102008030363 A1 | 1/2010 |
| EP | 3569995 A1 | 11/2019 |

\* cited by examiner

MEDIA-RESISTANT PRESSURE SENSOR FOR LARGE PRESSURE RANGES

CROSS REFERENCE TO RELATED APPLICATION

This application claims priority to German Patent Application No. 102021102046.8, filed on Jan. 29, 2021, the contents of which are incorporated by reference herein in their entirety.

TECHNICAL FIELD

The present disclosure relates to a pressure sensor and to the use of the latter for measuring pressure.

BACKGROUND

Fuel cells are becoming increasingly important in the field of electro-mobility. The hydrogen required for their operation must be stored and transported at high pressures (up to 700 bar or more). The provision of the infrastructure required for this purpose comprises setting up local generators for producing hydrogen through to distributing the hydrogen via hydrogen filling stations. In this case, hydrogen containers, pipe connections, and the like may utilize pressure sensors to monitor a pressure of the hydrogen within the hydrogen containers, the pipe connections, and the like. Pressure sensors, in particular for large pressure ranges, are also being increasingly used in other fields and in conjunction with other media.

In particular, the high pressures and chemical properties of hydrogen are a particular challenge for pressure sensors. On the one hand, it may be beneficial to measure both low to medium and high pressures of 700 bar or more as precisely as possible in hydrogen containers and the like. On the other hand, hydrogen has the property, inter alia, of being incorporated in the grid structure of metals, which can result in the material becoming brittle and can therefore destroy the materials. This diffusion process is also accelerated by the prevalence of high pressures and temperatures. Media other than hydrogen may also constitute a problem for the resistance of the materials of pressure sensors.

For these and other reasons, there is the need for the present disclosure.

SUMMARY

Various aspects relate to a pressure sensor comprising a housing, a flexible membrane which, together with the housing, forms a hermetically closed cavity, a sensor element arranged in the cavity, and a gaseous medium in the cavity.

Various aspects relate to the use of a pressure sensor in a pressure-carrying device such as a container, a pipe, or a line, wherein the pressure sensor comprises a housing, a flexible membrane which, together with the housing, forms a hermetically closed cavity, a sensor element arranged in the cavity, and a gaseous medium in the cavity.

BRIEF DESCRIPTION OF THE DRAWINGS

A pressure sensor according to the disclosure is explained in more detail below based on drawings. The elements shown in the drawings are not necessarily rendered in a manner true to scale relative to one another. Identical reference signs may denote identical components. The same reference numbers denote corresponding identical or similar parts.

DETAILED DESCRIPTION

The following detailed description refers to the accompanying drawings which form part of this description and show, for the purpose of illustration, specific implementations in which the disclosure can be practiced. In this case, directional terminology such as "at the top", "at the bottom", "at the front", "at the rear", "leading", "trailing" etc. is used with respect to the orientation of the figure(s) to be described. Since the component parts of implementations can be positioned in different orientations, the directional designation is used for illustration and is not restrictive in any way. It should be understood that other implementations can also be used and structural or logical changes can be made without exceeding the scope of the present disclosure. The following detailed description should therefore not be understood as being restrictive, and the scope of the present disclosure is defined by the attached claims.

It should be noted that the features of the various example implementations described here can be combined with one another, unless expressly stated otherwise.

As used in this description, the terms "adhesively bonded", "fastened", "connected", "coupled" and/or "electrically connected/electrically coupled" do not mean that the elements or layers have to be directly contact-connected to one another; intermediate elements or layers may be provided between the "adhesively bonded", "fastened", "connected", "coupled" and/or "electrically connected/electrically coupled" elements. According to the disclosure, however, the terms mentioned above may also optionally have the specific meaning that the elements or layers are directly contact-connected to one another, that is to say that no intermediate elements or layers are provided between the "adhesively bonded", "fastened", "connected", "coupled" and/or "electrically connected/electrically coupled" elements.

Furthermore, the word "above", which is used with respect to a part, an element or a material layer which is formed or arranged "above" a surface, may mean here that the part, the element or the material layer is arranged (for example placed, formed, deposited etc.) "indirectly" on the implied surface, wherein one or more additional parts, elements or layers are arranged between the implied surface and the part, the element or the material layer. The word "above", which is used with respect to a part, an element or a material layer which is formed or arranged "above" a surface, may however optionally also have the specific meaning that the part, the element or the material layer is arranged (for example placed, formed, deposited etc.) "directly on", for example in direct contact with, the implied surface.

Figure 1A:
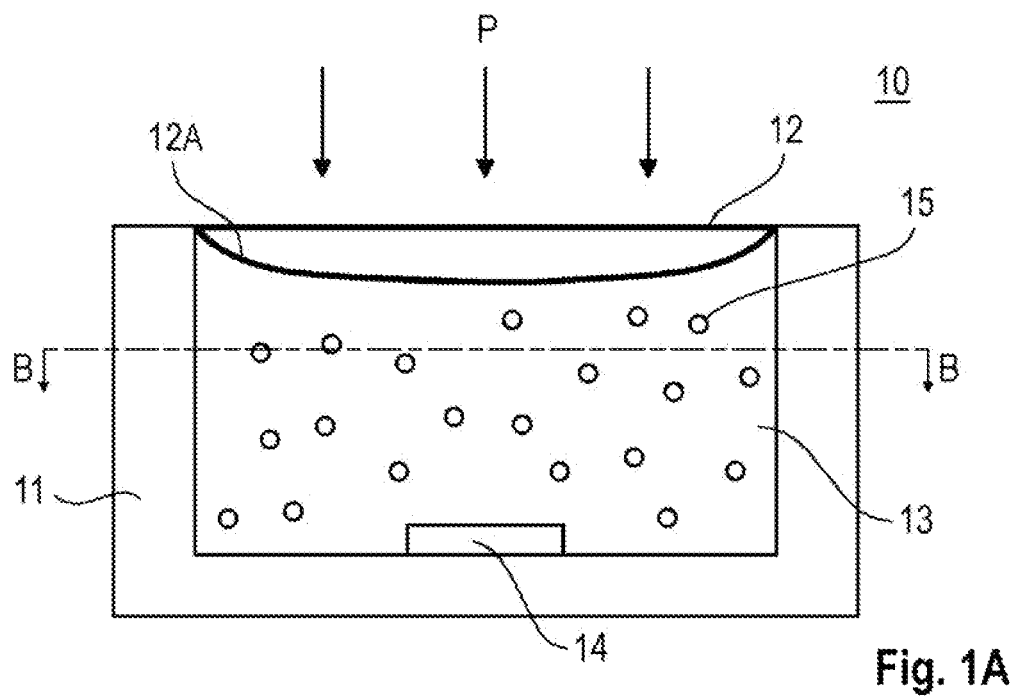
FIGS. 1A and 1B show a basic example implementation of a pressure sensor in a vertical longitudinal section (A) and a horizontal cross section along axis B-B in FIG. 1A (B).
Figure 1B:
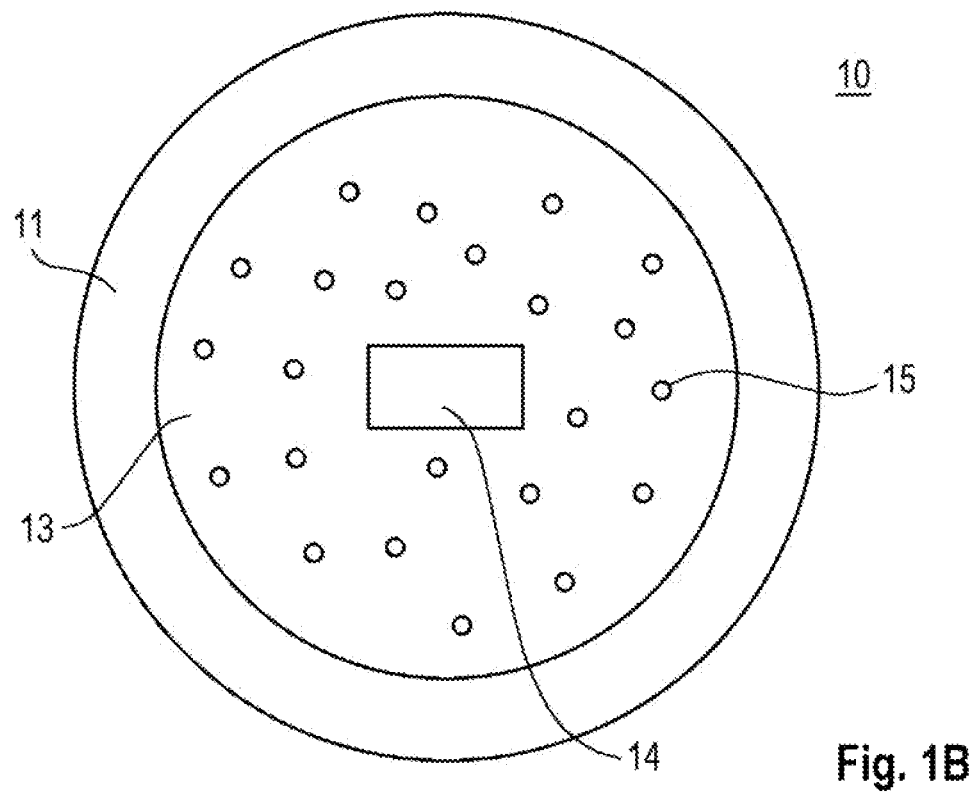

FIGS. 1A and 1B show a basic example implementation of a pressure sensor according to the present disclosure.

The pressure sensor 10 according to FIGS. 1A and 1B contains a housing 11, a flexible membrane 12 which, together with the housing 11, forms a hermetically closed cavity 13, a sensor element 14 arranged in the cavity 13, and a gaseous medium 15 in the cavity 13.

The pressure P which is to be measured and acts on the membrane from the outside is indicated using arrows in FIG. 1A. The sensor element 14 does not directly measure the pressure P acting on the membrane from the outside, but rather detects a change in a physical variable, which results from the fact that the membrane 12 is pressed inward into the cavity 13 by a particular amount by the external pressure P and assumes a position indicated using the reference numeral 12A. According to its method of operation, the pressure sensor may be in the form of a pressure transmitter. The pressure P acting on the membrane 12 from the outside presses the membrane into the cavity 13 by a particular volume amount $\Delta V$, the displacement volume, as a result of which the volume of the cavity 13 is reduced by this volume amount $\Delta V$ and the pressure of the gaseous medium 15 is increased. This pressure increase can be measured by a sensor element 14 in the form of a pressure sensor and is used as a measure of the externally prevailing pressure. After carrying out a calibration, a calibration curve can be stored in an evaluation circuit arranged on an application-specific integrated circuit (ASIC). The ASIC can either be integrated together with the sensor element on a common semiconductor die or can be provided as a separate component in or outside the cavity.

In addition to the pressure change inside the cavity 13, however, it is also possible to measure another physical variable which undergoes a change as a result of the membrane 12 which is pressed inward. For example, the deflection of the membrane 12 can be measured, wherein the sensor element 14 may be in the form of an optical sensor or an ultrasonic sensor in this case which determines the drop of the membrane, for example by measuring the time of flight of an optical pulse or sound pulse emitted by the sensor element and reflected at the membrane. This is described in more detail further below using a specific example implementation.

The sensor element 14 can consequently have one or more from a group containing a pressure sensor, a thermal conductivity sensor, a speed of sound sensor, a pellistor, a catalytic sensor, an inductive sensor, a capacitive sensor, a resistive sensor, an optical sensor, or a magnetic sensor.

Irrespective of the method of operation and functioning of the sensor element 14, the sensor element 14 may be constructed and produced as a micro-electromechanical sensor (MEMS).

According to one example implementation, the gaseous medium 15 is air. In some implementations, the gaseous medium is air at atmospheric pressure. The gaseous medium being air at atmospheric pressure may facilitate the production process since no artificial atmosphere of another gas needs to be provided while fastening the membrane to the housing. Since all gases are compressible, however, any other gaseous medium can also be used, in principle.

According to one example implementation, the flexible membrane 12 is produced from a metal. In some implementations, the flexible membrane 12 may be produced from steel or stainless-steel. The housing 11 may also be produced from metal. In some implementations, the housing 11 may be produced from steel or stainless-steel. Producing the flexible membrane 12 and the housing 11 from metal may increase or maximize the resistance of the pressure sensor to aggressive media such as hydrogen.

As will also be able to be seen in further implementations, the flexible membrane 12 may have a lamellar structure. This may be provided in the form of concentric circles around a center of the membrane, wherein the membrane is corrugated in each of these concentric circles. This means that the membrane can yield to the external pressure without hindrance and can extend into the cavity. The membrane uses, to a certain extent, the material of the corrugated regions in order to expand into the cavity. For this purpose, however, a suitable membrane design other than a lamellar structure may also be provided. The use of a membrane without such structures is also conceivable, in particular for lower pressures.

As will likewise also be able to be seen in further implementations, the housing of the pressure sensor may have a fastening structure which is configured to connect the pressure sensor to an external fastening element. This may be, for example, an external thread, an internal thread, or a snap connection. The external fastening element may be arranged, for example, on the inner wall of a hydrogen tank or the inner wall of a pipeline and constitutes the counterpart of the fastening structure.

Figure 2A:
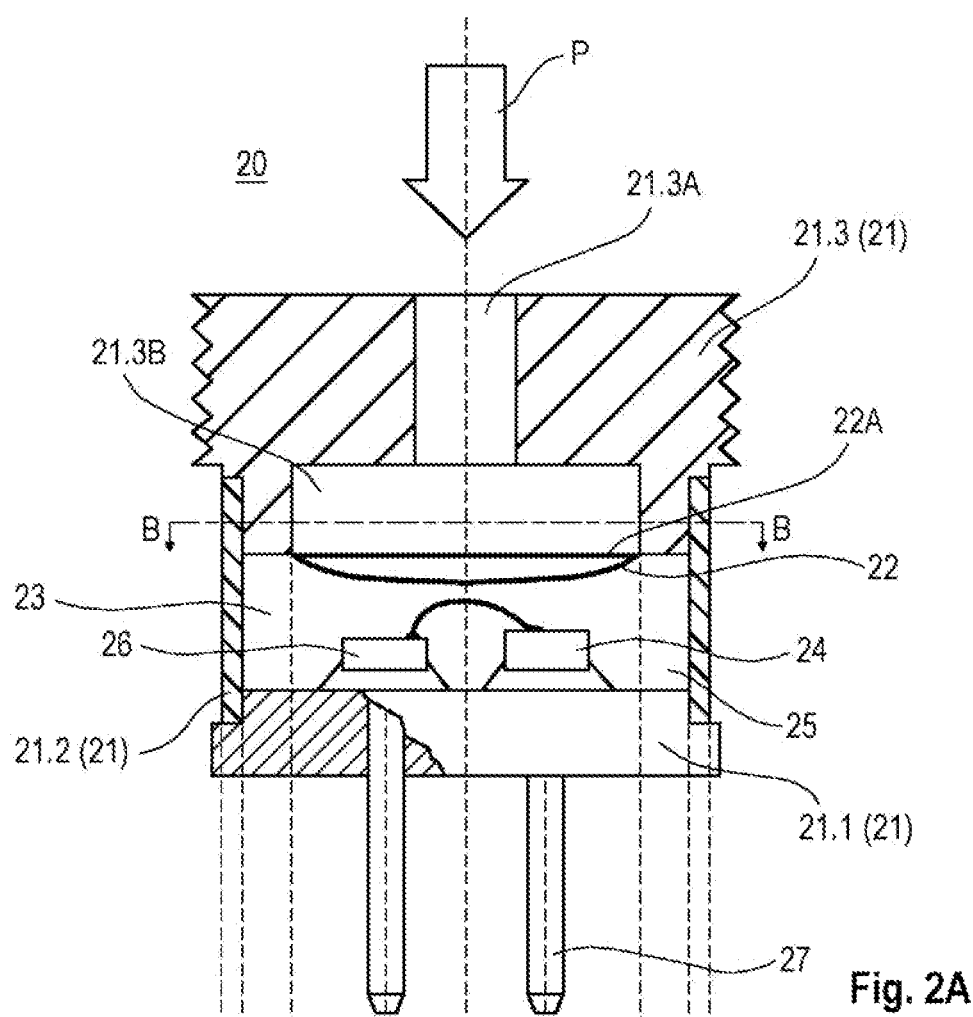
FIGS. 2A and 2B show an example implementation of a pressure sensor arranged inside a transistor outline (TO)-like housing in a vertical longitudinal section (A) and a horizontal cross section along axis B-B in FIG. 2A (B).
Figure 2B:
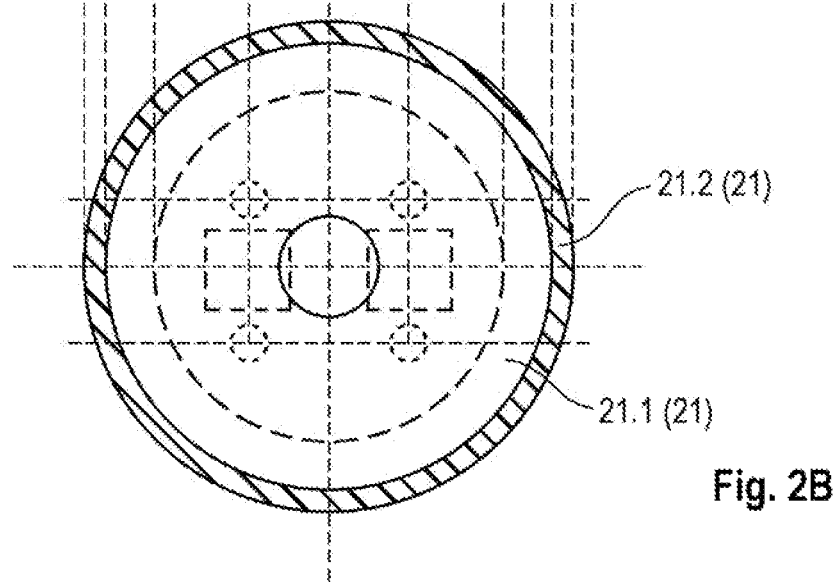

FIGS. 2A and 2B show an example implementation of a pressure sensor in a vertical longitudinal section (A) and a horizontal cross section along axis B-B in FIG. 2A (B).

The pressure sensor 20 according to FIGS. 2A and 2B contains a housing 21, a flexible membrane 22 which, together with the housing 21, forms a hermetically closed cavity 23, a sensor element 24 arranged in the cavity 23, and a gaseous medium 25 in the cavity 23. FIG. 2A also again shows the membrane 22A in the pushed-in state.

The housing 21 of the pressure sensor 20 has a multi-part structure. It has a circular metal base plate 21.1, to the upper surface of which the sensor element 24 is applied. In addition to the sensor element 24, an ASIC semiconductor die 26 is applied to the upper surface of the base plate 21.1 and is electrically connected to the sensor element 24 using a bonding wire, for example. Pins 27 which are guided through the base plate 21.1 and project from the lower surface of the latter as external contact elements are electrically connected to the semiconductor dies 24 and 26. A cylindrical housing wall 21.2, between the inner walls of which the membrane 22 is situated, is applied to the edge region of the base plate 21.1. In this example implementation, the cavity is therefore formed by the base plate 21.1, the cylindrical housing wall 21.2 and the membrane 22. This part of the pressure sensor 20 therefore resembles a transistor outline (TO) package.

The housing 21 also has an upper cylindrical metal block 21.3, the lower section of which has an external diameter which is slightly smaller than the internal diameter of the cylindrical housing wall 21.2. The metal block 21.3 is pushed, by way of this lower section, into the upper section of the cylindrical housing wall 21.2. The cylindrical metal block 21.3 also has an internal hole having two sections of different diameter. Whereas a first, upper section 21.3A having a relatively small diameter extends downward from the upper surface, a second, lower section 21.3B with a relatively large diameter adjoins it, wherein the membrane 22 is arranged below this second section 21.3B and can be fastened, for example, to the lower edge of the lower section 21.3B. As indicated by the arrow P, the gas flows through the upper section 21.3A and then fills the lower section 21.3B.

As can likewise be seen in FIG. 2A, an upper section of the metal block 21.3 has an external thread which can be used to insert the pressure sensor 20, for example, into a hole in a wall of a pressure-carrying device, for example a pressure container such as a hydrogen tank or a pipeline, which hole has an internal thread.

Figure 3A:
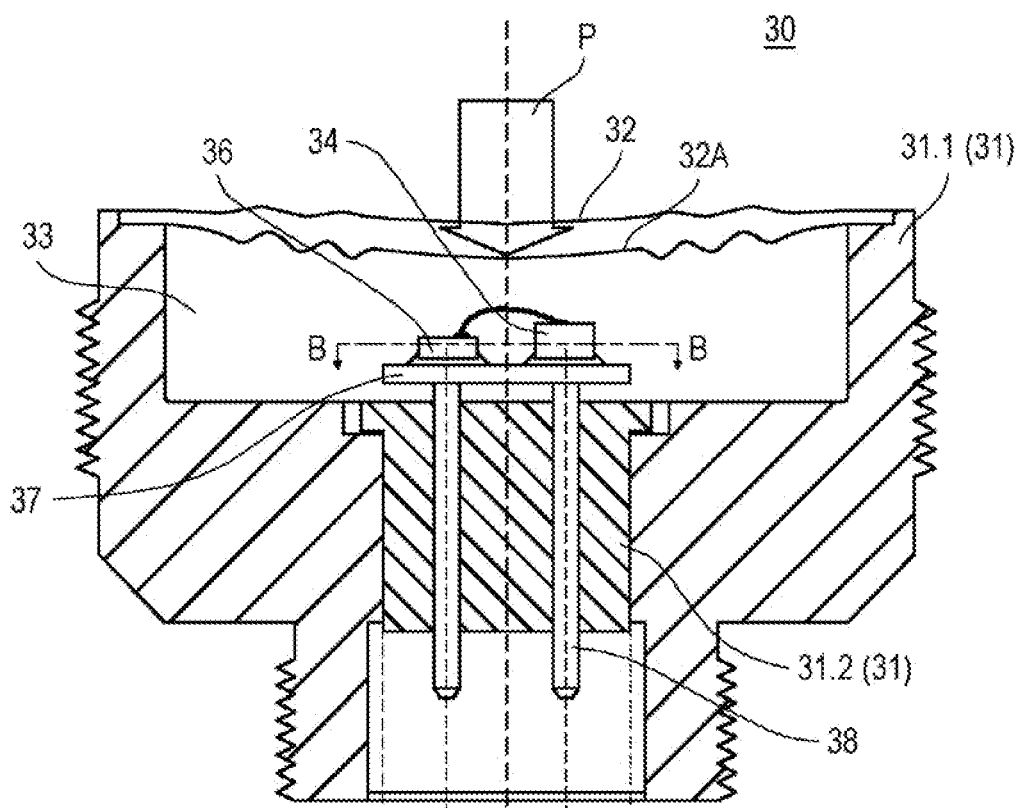
FIGS. 3A and 3B show, as an example implementation, a pressure sensor with metal bellows in a vertical longitudinal section (A) and a horizontal cross section along axis B-B in FIG. 3A (B).
Figure 3B:
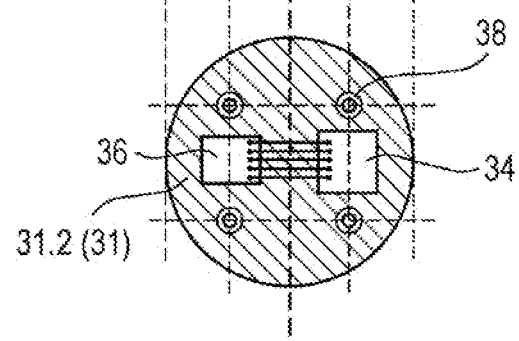

FIGS. 3A and 3B show an example implementation of a pressure sensor in a vertical longitudinal section (A) and a horizontal cross section along axis B-B in FIG. 3A (B).

The pressure sensor 30 according to FIGS. 3A and 3B contains a housing 31, a flexible membrane 32 which, together with the housing 31, forms a hermetically closed cavity 33, a sensor element 34 arranged in the cavity 33, and a gaseous medium 35 in the cavity 33. FIG. 3A again also shows the membrane 32A in the pushed-in state. The housing 31 can therefore be understood as meaning both a receptacle for the sensor system (circuit board, sensor element, circuit elements) and as a seal of the pressure chamber of the sensor.

The housing 31 of the pressure sensor 30 contains a cylindrical metal block 31.1 which has a central hole. The central hole has a first, upper section with a relatively large diameter and a second, lower section with a relatively small diameter which adjoins the first section. The membrane 32A is fastened to the upper edge of the upper section, with the result that the upper section forms the cavity 33. A stopper 31.2 is inserted into the second, lower section of the hole in such a manner that its upper surface and an upper surface of the metal block 31.1 are coplanar with respect to one another inside the first, upper section of the hole. A PCB 37, to which the sensor element 34 is fastened, is arranged on the upper surface of the stopper 31.2. An ASIC semiconductor die 36, which is electrically connected to the sensor element 34 using a bonding wire, is likewise applied to the PCB 37. Pins 38 which are guided through the stopper 31.2 and project from the lower surface of the latter as external contact elements are electrically connected to the semiconductor dies 34 and 36. In some implementations, the pins 38 project into an outwardly open lower central hole of the metal block 31.1.

The implementation shown in FIGS. 3A and 3B comprises an open wire connection between the sensor element 34 and the ASIC chip 36 in the cavity 33. Other implementations which do not have an open wire connection are conceivable. For example, the sensor element (for example MEMS chip) and the ASIC chip may be arranged on a common carrier (substrate). The sensor element, in particular in the form of a MEMS chip, can also be monolithically integrated together with the ASIC chip on a single semiconductor die. In some implementations, the sensor element and the ASIC chip may be produced as an SMD package (surface mount device) which is mounted on a circuit board by the customer.

As can likewise be seen in FIG. 3A, an upper section of the metal block 31.1 has an external thread which can be used to insert the pressure sensor 30, for example, into a hole in a wall of a pressure-carrying device such as a pressure container, for instance a hydrogen tank or a pipeline, which hole has an internal thread.

Figure 4A:
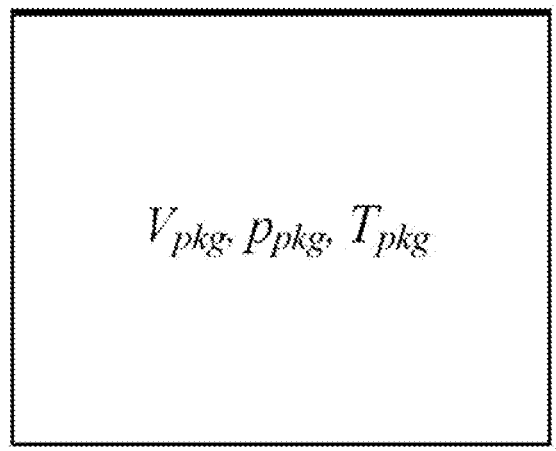
FIGS. 4A and 4B schematically show, for the purpose of illustrating the geometrical relationships, a pressure sensor without a pressure load (A) and a pressure sensor with a pressure load (B).
Figure 4B:
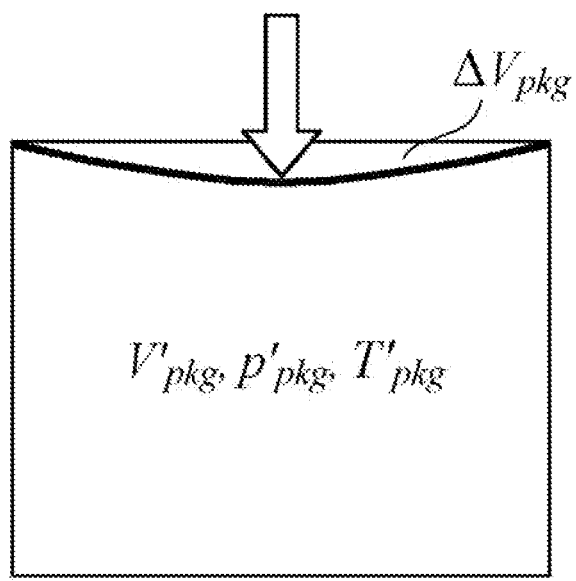

FIGS. 4A and 4B schematically show a pressure sensor without a pressure load (A) and a pressure sensor with a pressure load (B).

The parameters indicated in FIGS. 4A and 4B, specifically $V_{pkg}$, $p_{pkg}$, $T_{pkg}$ (volume, pressure, temperature without a pressure load) and $V'_{pkg}$, $p'_{pkg}$, $T'_{pkg}$ (volume, pressure, temperature with a pressure load) make it possible to carry out the following calculations with respect to the requirements imposed on a sensor element configured as a pressure sensor.

Assuming an ideal gas for the gaseous medium enclosed in the cavity, the following initially applies:

$$\cdot \frac{p_{pkg}}{p'_{pkg}} = \frac{V'_{pkg}}{V_{pkg}} \quad \quad 1)$$

$$\cdot p'_{pkg} = \frac{p_{pkg} \cdot V_{pkg}}{V'_{pkg}} = \frac{p_{pkg} \cdot V_{pkg}}{(V_{pkg} - \Delta V_{pkg})}$$

$$\cdot \Delta p_{pkg} := p'_{pkg} - p_{pkg} \quad \quad 2)$$

$$\cdot \Delta p_{pkg} = \frac{p_{pkg} \cdot V_{pkg}}{(V_{pkg} - \Delta V_{pkg})} - p_{pkg}$$

A cylindrical cavity with a radius of r=0.5 cm and a height of h=0.6 cm is also assumed. This results in the following, assuming a constant temperature in the cavity.

> $T_{pkg} = T'_{pkg}$
> $V_{pkg} = \pi r^2 \cdot h = \pi \cdot 0.5^2 \cdot 0.6 \text{ cm}^3 \approx 0.5 \text{ cm}^3$
> $p_{pkg} = 1 \text{ bar} = 1000 \text{ hPa}$
> Pressure load:
> $p_0 \in [0\text{-}1000]$ bar If a pressure sensor with the following measurement parameters is also assumed:

> Pressure range 300-1200 hPa→900 hPa
> Absolute accuracy+/−1 hPa
> => the sensor can resolve 900/1=900 "pressure stages"

This results in the following minimum condition for resolving a particular pressure range:

$$> \frac{\max \Delta p_{pkg}}{\min \Delta p_{pkg}} < 900$$

Figure 5A:
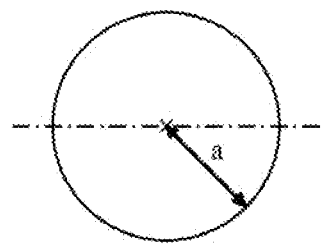
FIGS. 5A, 5B and 5C schematically show a membrane, for example a stainless-steel membrane, in a plan view (A) and in a lateral cross section (B) and a graph which shows the sagging of the membrane based on the location on the membrane (C).
Figure 5B:
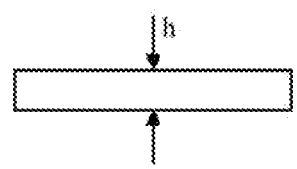
Figure 5C:
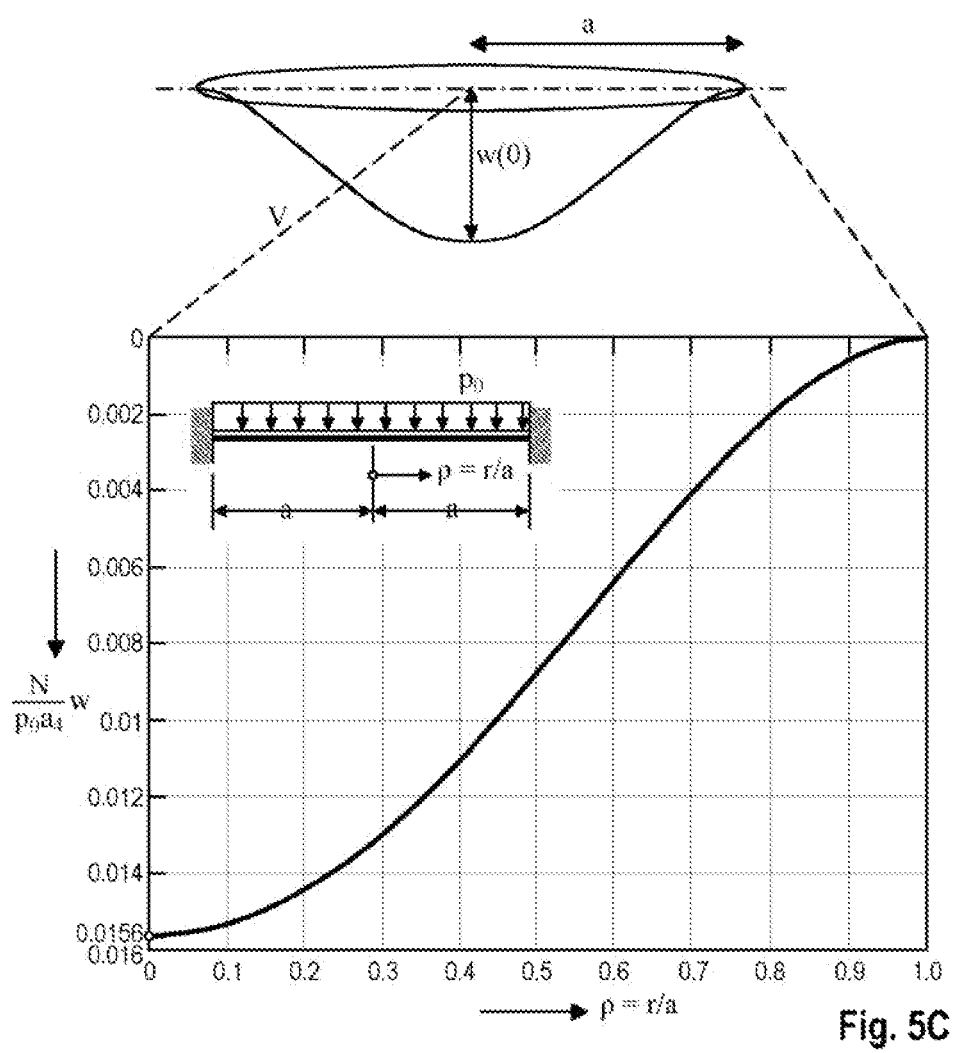

FIGS. 5A, 5B, and 5C schematically show a membrane in a plan view (A) and in a lateral cross section (B) and a graph which shows the sagging of the membrane based on the location on the membrane (C). The membrane may be produced from stainless-steel, for example. In some implementations, the membrane may be produced from one or more other materials such as titanium or metal alloys of aluminum (Al), copper (Cu), zinc (Zn), or plastics.

The following formula applies to the sagging of the membrane:

$$w(r) = \frac{3(1-v^2) \cdot a^4 \cdot p_0}{16 E h^3} \cdot \left(1 - \left(\frac{r}{a}\right)^2\right)^2$$

where:
w Sagging
v Poisson's ratio
a Radius p₀ Pressure load
E Young's modulus
h Membrane thickness The displacement volume can be calculated therefrom as follows.

$$N = \frac{E \cdot h^3}{12 \cdot (1-v^2)}$$

$$w_0 = w(0) = \frac{a^4 \cdot p_0}{64N}$$

$$r(w) = \sqrt{a^2 - \frac{8\sqrt{N}\sqrt{w_0}}{\sqrt{p_0}}}$$

$$\Delta V_{pkg} = \pi \cdot \int_0^{w_0} r^2(w)dw =$$

$$\pi \cdot \int_0^{w_0} \left(\sqrt{a^2 - \frac{8\sqrt{N}\sqrt{w_0}}{\sqrt{p_0}}}\right)^2 dw = \pi \cdot \left(a^2 w_0 - \frac{16\sqrt{N} w_0^{\frac{3}{2}}}{3\sqrt{p_0}}\right)$$

Figure 6:
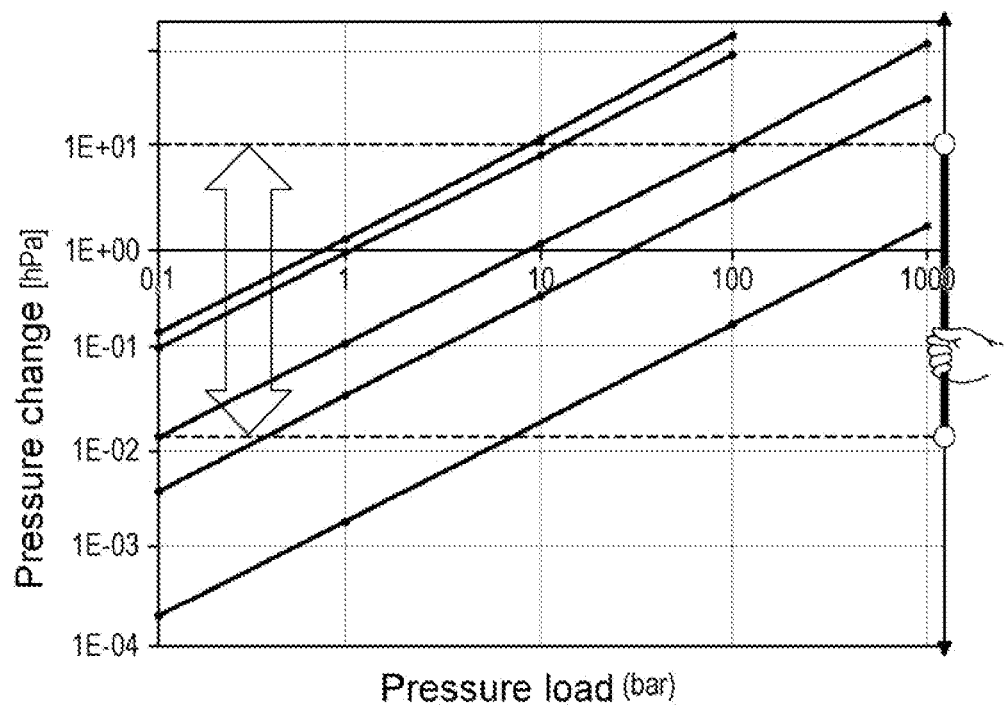
FIGS. 6A, 6B and 6C schematically show a stainless-steel membrane in a plan view (A) and in a lateral cross section (B) and a graph which shows the pressure change inside the cavity based on the external pressure load.

FIG. 6 shows a graph showing the pressure change inside the cavity based on the external pressure load.

The following values of a and h apply to the curves from bottom to top (the variables a and h are shown in FIGS. 5A and 5B):
a=2.5 mm; h=400 µm
a=5.0 mm; h=600 µm
a=5.0 mm; h=400 µm
a=5.0 mm; h=200 µm
a=7.5 mm; h=400 µm The region shown by the broad arrow determines the minimum resolvable pressure range. A pressure translation of 100 bar/10 mbar=10⁴, FS range 100 bar, absolute accuracy 0.1 bar, applies to the curve having the parameters a=5.0 mm and h=400 µm.

The results shown in FIG. 6 relate to a planar volume membrane. This example calculation is evidence of the general functionality. Adapted to the respective geometries and pressures, commercially available metal membranes and prefabricated membranes will exhibit substantially better performance.

ASPECTS

Apparatuses and methods according to the disclosure are explained below based on aspects.

Aspect 1 is a pressure sensor comprising a housing, a flexible membrane which, together with the housing, forms a hermetically closed cavity, a sensor element arranged in the cavity, and a gaseous medium in the cavity.

Aspect 2 is the pressure sensor according to aspect 1, in which the gaseous medium is air.

Aspect 3 is the pressure sensor according to aspect 2, in which the air is at atmospheric pressure or at a positive or negative pressure required for the application.

Aspect 4 is the pressure sensor according to one of the preceding aspects, in which the flexible membrane is produced from a metal.

Aspect 5 is the pressure sensor according to aspect 4, in which the metal is steel or stainless steel.

Aspect 6 is the pressure sensor according to one of the preceding aspects, in which the flexible membrane has a lamellar structure.

Aspect 7 is the pressure sensor according to one of the preceding aspects, in which the sensor element is a microelectromechanical sensor (MEMS).

Aspect 8 is the pressure sensor according to one of the preceding aspects, in which the sensor element has one or more from a group containing a pressure sensor, a thermal conductivity sensor, a speed of sound sensor, a pellistor, a catalytic sensor, an inductive sensor, a capacitive sensor, a resistive sensor, an optical sensor or a magnetic sensor.

Aspect 9 is a pressure sensor according to one of the preceding aspects, which is resistant to aggressive media.

Aspect 10 is a pressure sensor according to aspect 9, which is resistant to hydrogen.

Aspect 11 is a pressure sensor according to one of the preceding aspects, in which the housing has a fastening structure which is configured to connect the pressure sensor to an external fastening element.

Aspect 12 is a pressure sensor according to aspect 11, in which the fastening structure has an external thread, an internal thread or a snap connection.

Aspect 13 is a pressure sensor according to one of the preceding aspects, in which the sensor element is monolithically integrated, together with an ASIC which contains an evaluation circuit, on a semiconductor die.

Aspect 14 is a pressure sensor according to one of aspects 1 through 12, which, in addition to the sensor element, has a semiconductor die having an ASIC which is arranged thereon and contains an evaluation circuit.

Aspect 15 is the use of a pressure sensor in a pressure-carrying device such as a container, a pipe, or a line, wherein the pressure sensor comprises a housing, a flexible membrane which, together with the housing, forms a hermetically closed cavity, a sensor element arranged in the cavity, and a gaseous medium in the cavity.

Although specific implementations have been illustrated and described here, those of ordinary skill in the art will appreciate that a multiplicity of alternative and/or equivalent implementations can replace the specific implementations shown and described, without exceeding the scope of the present disclosure. This application is intended to cover all adaptations or variations of the specific implementations discussed here. The intention is therefore for this disclosure to be restricted only by the claims and their equivalents.

The invention claimed is:
1. A pressure sensor, comprising:
a housing;
a flexible membrane which, together with the housing, forms a hermetically closed cavity;
a printed circuit board (PCB) that is in the hermetically closed cavity;
a sensor element, in the hermetically closed cavity and on a top surface of the PCB, configured to detect a change in a physical property, of the flexible membrane, associated with an external pressure pressing inward into the flexible membrane of the hermetically closed cavity;
an application-specific integrated circuit (ASIC) semiconductor die, in the hermetically closed cavity and on the top surface of the PCB, electrically connected to the sensor element;
a gaseous medium in the hermetically closed cavity; and
a first pin, electrically connected to one of the sensor element or the ASIC semiconductor die, extending beyond a bottom surface of the PCB and through a lower surface of either the housing or a stopper within the housing.

2. The pressure sensor of claim 1, wherein the gaseous medium is air.

3. The pressure sensor of claim 2, wherein the air is at atmospheric pressure or at a positive pressure or a negative pressure.

4. The pressure sensor of claim 1, wherein the flexible membrane is produced from a metal.

5. The pressure sensor of claim 1, wherein the flexible membrane has a lamellar structure.

6. The pressure sensor of claim 1, wherein the sensor element is a micro-electromechanical sensor (MEMS).

7. The pressure sensor of claim 1, wherein the sensor element comprises at least one of a pressure sensor, a thermal conductivity sensor, a speed of sound sensor, a pellistor, a catalytic sensor, an inductive sensor, a capacitive sensor, a resistive sensor, an optical sensor, or a magnetic sensor.

8. The pressure sensor of claim 1, wherein the pressure sensor is resistant to aggressive media.

9. The pressure sensor of claim 8, wherein the pressure sensor is resistant to hydrogen.

10. The pressure sensor of claim 1, wherein the housing has a fastening structure which is configured to connect the pressure sensor to an external fastening element.

11. The pressure sensor of claim 1, wherein the sensor element is monolithically integrated together with the ASIC semiconductor die.

12. The pressure sensor of claim 1, wherein the first pin is directly below the sensor element or the ASIC semiconductor die.

13. The pressure sensor of claim 1, wherein the ASIC semiconductor die contains an evaluation circuit.

14. A method, comprising:
utilizing a pressure sensor in a pressure-carrying device to monitor a pressure of the pressure-carrying device based on a sensor element, of the pressure sensor, detecting a change in a physical property, of a flexible membrane of the pressure sensor, associated with an external pressure pressing inward into the flexible membrane of a hermetically closed cavity, of the pressure sensor and formed by a housing of the pressure sensor and the flexible membrane, holding the sensor element and a gaseous medium,
wherein the pressure sensor is within the hermetically closed cavity, and comprises
an application-specific integrated circuit (ASIC) semiconductor die, in the hermetically closed cavity and on a top surface of a printed circuit board (PCB), electrically connected to the sensor element, and
a pin electrically connected to one of the sensor element or the ASIC semiconductor die, extending beyond a bottom surface of the PCB and through a lower surface of either the housing or a stopper within the housing.

15. The method of claim 14, wherein the pressure-carrying device includes one or more of a container, a pipe, or a line.

16. The method of claim 14, wherein utilizing the pressure sensor in the pressure-carrying device to monitor the pressure of the pressure-carrying device comprises:
detecting, by the sensor element of the pressure sensor, the change in the physical property of the flexible membrane; and
determining the pressure of the pressure-carrying device based on the change in the physical property of the flexible membrane.

17. The method of claim 14, wherein the external pressure pressing inward into the flexible membrane displaces a portion of the flexible membrane into the hermetically closed cavity.

18. The method of claim 16, wherein determining the change in the physical property associated with the flexible membrane comprises:
measuring a deflection of the flexible membrane of the hermetically closed cavity, wherein the pressure of the pressure-carrying device is determined based on the deflection of the flexible membrane of the hermetically closed cavity.

19. The method of claim 18, wherein measuring the deflection of the flexible membrane of the hermetically closed cavity comprises:
measuring a time of flight of an optical pulse or a sound pulse emitted by the pressure sensor and reflected at the flexible membrane; and
determining the deflection of the flexible membrane of the hermetically closed cavity based on the time of flight of the optical pulse or the sound pulse.

20. The pressure sensor of claim 1, further comprising:
a second pin, electrically connected to another one of the sensor element or the ASIC semiconductor die, extending from the bottom surface of the PCB and through the lower surface of either the housing or the stopper within the housing.

* * * * *